June 28, 1960   H. L. TORBETT   2,942,800
AUTOMATIC FISHING REEL
Filed June 11, 1956   2 Sheets-Sheet 1
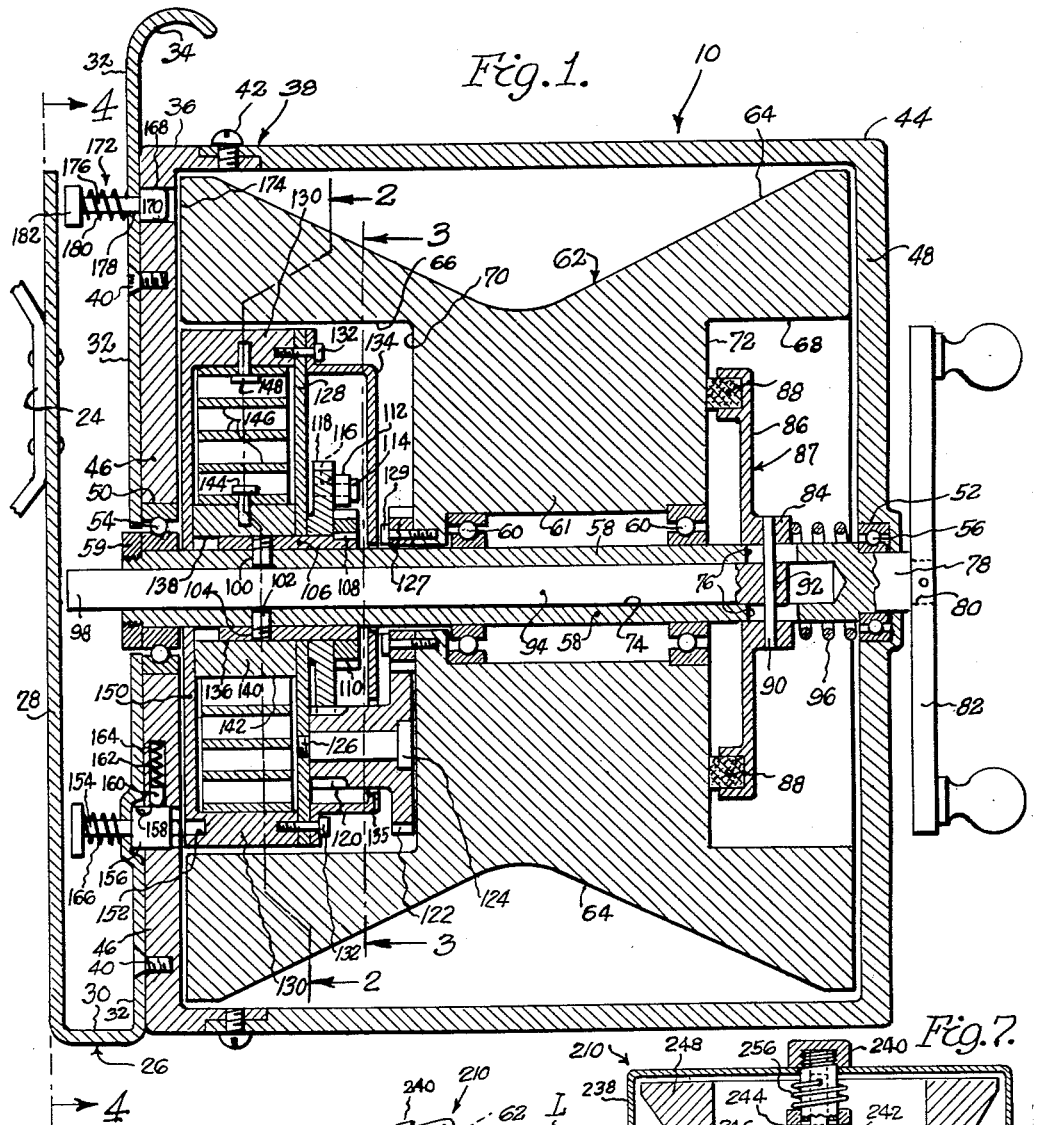
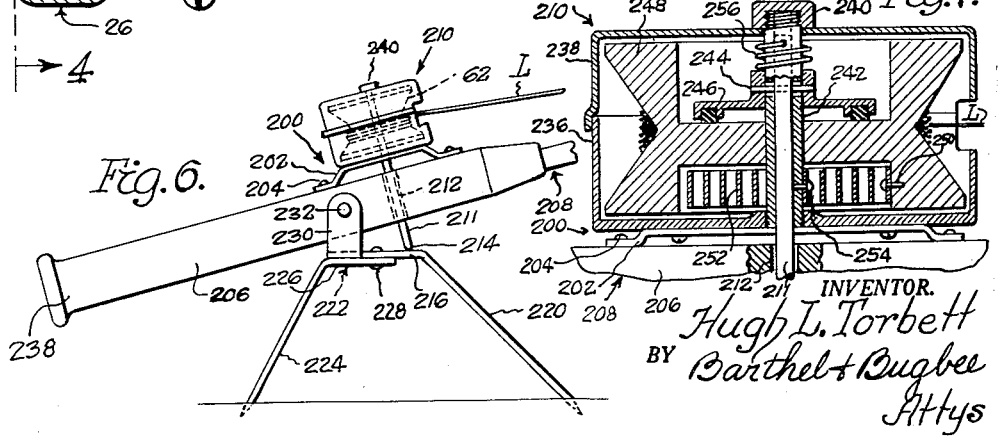
INVENTOR.
Hugh L. Torbett
BY Barthel + Bugbee
Attys June 28, 1960 H. L. TORBETT 2,942,800
AUTOMATIC FISHING REEL
Filed June 11, 1956 2 Sheets-Sheet 2

INVENTOR.
Hugh L. Torbett
BY Barthel & Bugbee
Attys

United States Patent Office 2,942,800
Patented June 28, 1960

2,942,800
AUTOMATIC FISHING REEL
Hugh L. Torbett, 769 Lenox Ave., Detroit, Mich.
Filed June 11, 1956, Ser. No. 590,716
7 Claims. (Cl. 242—84.3)

This invention relates to fishing reels and, in particular, to so-called automatic reels with spring-wound line spools.

One object of this invention is to provide a spring-wound automatic fishing reel wherein the line spool is provided with a brake and a snubber which are operated sequentially by a single motion of a control member, so that the fisherman can quickly and easily release the brake to permit the spring to cause the spool to reel in the line and thereafter snub the rotation of the spool by a further motion of the control member.

Another object is to provide a spring-wound automatic fishing reel of the foregoing character wherein the control member forms a part of a resilient reel mount, so that the motion of the control member causes the reel to move bodily toward the remainder of the mount and, in so doing, to sequentially release the spool brake and apply the spool snubber.

Another object is to provide a spring-wound automatic fishing reel of the foregoing character wherein the driving connection between the spring and the spool can be selectively thrown into and out of engagement in such a manner as to permit the line spool to rotate freely while maintaining the spring in its wound condition, thereby enabling the free "stripping" of the line, as in trout fishing, with only a slight pull required, in contrast with the heavy pull of conventional reels.

Another object is to provide a spring-wound automatic fishing reel which is, by a slight modification, adapted for use with an automatic ice-fishing tip-up whereby any desired amount of line may be paid out according to the depth of the water, yet which instantly and automaitcally releases the brake to cause the spring-wound spool to jerk the line, thereby setting the hook in the mouth of the fish.

Another object is to provide a spring-wound automatic fishing reel of the foregoing character wherein the spool and spring assembly may be thrown into or out of connection with the casing so as to permit the free rotation of the assembly without spring assistance, and enable the spool to be hand-operated or spring-operated, as desired, thereby providing a reel which can be used either as an automatic reel or as a manual reel, as desired.

Other objects and advantages of the invention will become apparent during the course of the following description of the accompanying drawings, wherein:

Figure 1 is a central vertical section through an automatic reel with sequential release of brake and actuation of snubber, according to one form of the invention;

Figure 6 is a side elevation on a reduced scale of a slight modification of the fishing reel of Figure 1, forming a part of an automatic ice fishing tip-up; and Figure 7 is a central vertical section through the simplified reel shown in Figure 6.

Figure 2:
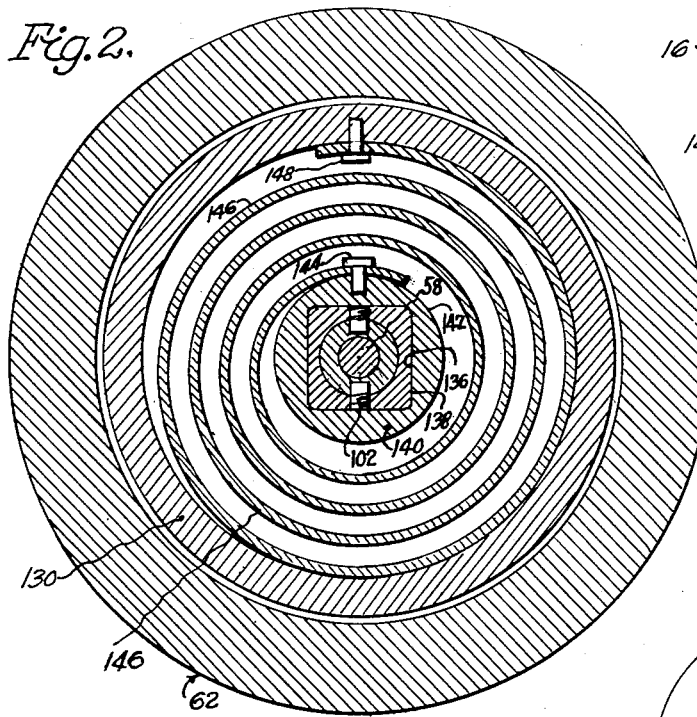
Figure 2 is a cross-section through the winding spring, taken along the line 2—2 in Figure 1.
Figure 5:
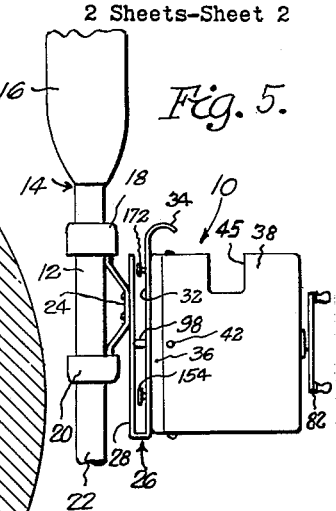
Figure 5 is a side elevation on a reduced scale of the automatic reel of Figures 1 to 4 inclusive, attached to a fishing rod.
Figure 4:
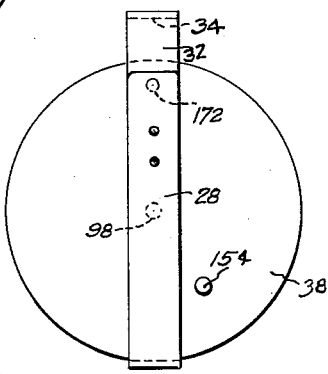
Figure 4 is a cross-section on a reduced scale, taken along the line 4—4 in Figure 1, showing the reel substantially in lefthand end elevation.

Referring to the drawings in detail, Figures 1 to 5 inclusive show a spring-wound automatic fishing reel, generally designated 10, according to one form of the invention as mounted upon the reel seat 12 of a conventional fishing rod, generally designated 14 (Figure 5). The fishing rod 14 is conventional and its details are beyond the scope of the present invention, for the purposes of which it may be said to have a handle or grip 16, usually of cork, and fixed and movable collars 18 and 20 respectively anchoring the reel 10 to the reel seat 12. The rod 22 itself has the usual line guides (not shown).

The automatic reel 10 is provided with a twin-armed bracket 24 seated in the collars 18 and 20 against the reel seat 12 and riveted or otherwise secured to a resilient reel mount, generally designated 26, of spring material, such as spring steel. The reel mount 26 is of approximately U-shaped construction with a fixed arm 28 riveted to the bracket 24, a bridge portion 30, and a movable arm 32 terminating in a finger hook or grip 34. The arms 28 and 32 are preferably integral with the bridge portion 30 and sufficient resilience is provided that the fisherman with his finger on the finger grip 34 of the movable arm 32 and his hand around the rod handle 16 may push the movable arm 32 toward the fixed arm 28 by the application of pressure of one finger in order to operate the reel mechanism, as described below in connection with the operation of the invention. The movable arm 32, as will be seen below, serves as a control member by which the principal actions of the reel 10 are controlled and for that purpose, the base 36 of the reel housing 38 is secured thereto as by the screws 40. Secured to the base 36 as by the screws 42 is a cup-shaped reel housing cover 44 having an aperture 45 therein (Figure 5) for the passage of the fishing line (not shown).

The reel housing base 36 and cover 44 have end plates or disc-shaped walls 46 and 48 respectively, these being centrally bored as at 50 and 52 respectively to receive anti-friction bearings 54 and 56 which rotatably support a hollow shaft or spindle 58, the rearward end of which is threaded to receive a retaining nut 59. The intermediate portion of the hollow shaft 58 carries spaced anti-friction bearings 60 which in turn rotatably support the hub 61 of a line spool 62 having a centrally-depressed line-receiving surface 64 of circular cross-section, and also having inner and outer cup-shaped recesses 66 and 68 respectively having inner and outer end walls 70 and 72 respectively.

The hollow shaft 58 is provided with a central bore 74 having aligned elongated radial slots 76 opening transversely outward therefrom. The outer end of the hollow shaft 58 has a solid stem portion 78 with a reduced diameter end portion 80 to which a winding knob or crank 82 is pinned or otherwise drivingly secured. Slidably mounted on the hollow shaft 58 near the end wall 48 of the housing cover 44 is the hub 84 of a brake disc or arm 86 on the periphery of which is mounted a brake lining or pad 88. The hub 84 is drilled transversely to receive a pin 90 which passes through the elongated slots 76 and also through a radial hole 92 in a brake control shaft or inner shaft 94 which is slidably mounted in the bore 74 of the hollow shaft 58. A helical compression spring 96 disposed between the hub 84 and the housing cover end wall 48 urges the brake linings 88 of the brake disc or arm 86 of a brake, generally designated 87, into braking engagement with the outer recess end wall 72 so as to normally hold the spool 62 stationary by its frictional engagement therewith. The rearward end 98 of the inner shaft 94 projects beyond the rearward end of the hollow shaft 58 into close proximity to the fixed arm 28 of the reel mount 26.

Near its rearward end, the hollow shaft 58 is provided with aligned radial holes 100 which receive radial studs 102, the outer ends of which are threaded into threaded holes 104 in a sleeve 106 mounted on the hollow shaft 58. Keyed or otherwise drivingly secured at 108 to the sleeve 106 is a toothed ratchet wheel 110, the teeth of which are engaged by the end of a pawl 112 (Figure 3) pivotally mounted on a pivot pin or screw 114, the rearward end of which is seated in an axial hole 116 in the peripheral portion of a gear 118. The pawl 112 is urged into engagement with the ratchet wheel 110 by a leaf spring 119 (Figure 3) mounted in a slotted pin 121 seated in the gear 118. The gear 118 is loosely and rotatably mounted on the sleeve 106 and meshes with a pinion 120 formed on the hub of a gear 122. The gear 122 is rotatably mounted upon a pivot screw 124, the reduced diameter rearward end of which is threaded into a hole 126 in a disc 128 likewise loosely and rotatably mounted on the sleeve 106. The gear 122 meshes with a ring gear 127 which is secured by screws 129 to the hub 61 of the spool 62. The disc 128 serves as the end plate or closure plate of a cup-shaped rotary spring housing 130 to which it is secured by screws 132. These screws 132 also serve to hold in place a roughly U-shaped bracket 134 (Figures 1 and 3) which is bored as at 135 to rotatably support the hub of the gear 122.

The external surface 136 of the sleeve 106 is of square outline (Figure 2) and fits into a bore 138 of square cross-section in a spring anchorage hub 140. The external surface 142 of the hub 140 is circular and has anchored to it, as by the pin or screw 144, the inner end of a spiral spring 146. The outer end of the spiral spring 146 is secured as by the screw or pin 148 to the spring housing 130, the end wall 150 of which is provided with a socket 152. Slidable into and out of engagement with the socket 152 is a headed reciprocating locking pin 154 carrying a detent drum or enlargement 156 having a detent recess 158 (Figure 1) engaged by a detent pin or ball 160 urged thereagainst by a compression spring 162 mounted in a socket 164 in the reel housing end wall 46. A compression spring 166 normally urges the pin 154 outward to cause disengagement of the inner end thereof from the socket 152, whereas the detent pin or ball 160 when in engagement with the recess 158 holds the end of the pin 154 in the socket 152 so as to releasably anchor the spring casing 130 to the base 36 of the reel housing 38.

The end wall 46 of the reel housing base 36 is bored as at 168 (Figure 1) to receive the enlarged end 170 of a snubber, generally designated 172, the end 170 frictionally engaging the outer end wall 174 of the spool 62. The end 170 is mounted upon a headed pin 176 which passes through a hole 178 in the movable arm 32 to the end 170. The pin 176 is urged outward away from the movable arm 32 by a compression spring 180 so as to normally urge the snubber 172 out of snubbing engagement with the spool 62. The head 182 of the snubber pin 176 is located slightly farther away from the fixed arm 28 of the reel mount 26 than the end 98 of the inner shaft 94 so that the latter will be shifted to release the brake 87 slightly in advance of the engagement of the snubber head 182 with the fixed arm 28 as the movable arm 32 is pulled toward the fixed arm 28 by the engagement of the forefinger with the hooked portion or finger grip 34.

Figure 3:
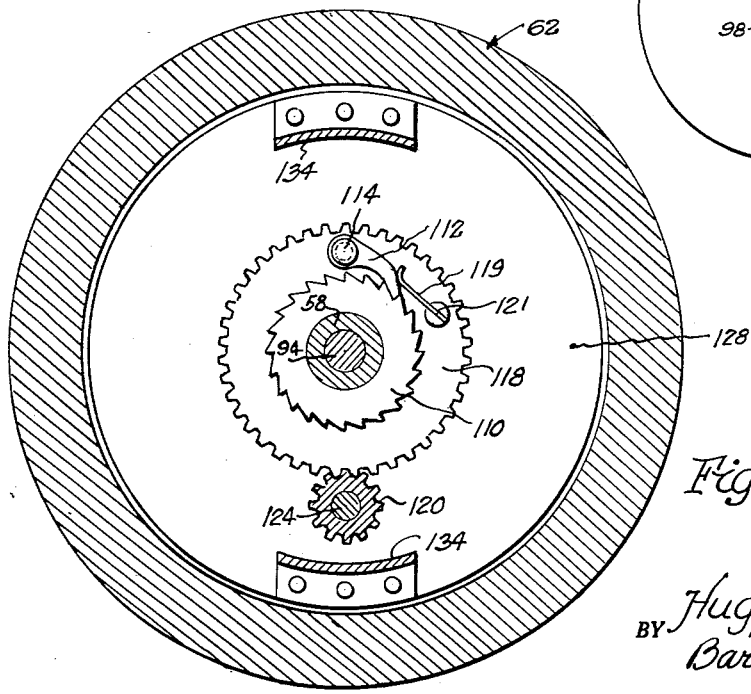
Figure 3 is a cross-section through the line spool adjacent the winding spring ratchet and spool gearing taken along line 3—3 in Figure 1.

In the operation of the automatic reel 10 of the present invention, let it be assumed that a fishing line (not shown) has been secured at its inner end to the spool 62 and wound thereon, and that the reel bracket 24 has been secured to the reel seat 12 (Figure 5) with the line passing outward through the aperture 45 in the reel housing cover 44 to the line guides on the rod 22. Let it also be assumed that the locking pin 154 has been pushed to the right to enter the socket 152 (Figure 1) and that the user has wound up the spring 146 by rotating the hand crank 82 and the hollow shaft 58 drivingly secured thereto. Let it further be assumed that the brake linings 88 are held in frictional engagement with the spool 62 by the spring 96. While the spring 146 is being wound up by the use of the hand crank 82, the pawl 112 clicks over the teeth of the ratchet wheel 110 as the latter is rotated by its driving connection through the pins 102 with the hollow shaft 58 (Figure 3).

To release the brake linings or pads 88 from braking engagement with the spool 62, the operator pulls or pushes the finger grip portion 34 of the movable arm 32 toward the fixed arm 28 by means of his forefinger, the consequent engagement of the end 98 of the inner shaft 94 pushing the latter and the brake arm or disc 86 together with the brake lining or linings 88 out of frictional braking engagement with the end wall 72 of the spool recess 68, freeing the spool 62. The latter is then free to be rotated by the thrust of the spiral spring 146, thereby reeling in the line and winding it upon the spool surface 64, at the same time hooking the fish and hauling him in toward the fisherman.

To snub the spool 62, the fisherman pulls the movable arm 32 further inward toward the fixed arm 28 until the latter presses the head 182 and pin 176 to the right (Figure 1), engaging the spool 62 and bringing it to a halt. The instant the fisherman relaxes his pull upon the movable arm 32, permitting the spring 180 to push the snubber 172 outward, the reel spool 62 resumes its rotation. If he continues to relax his grip and permit the movable arm 32 to move still further away from the fixed arm 28 by reason of its resilience so that the end 98 of the inner shaft 94 is released from engagement with the fixed arm 28, the spring 96 pushes the brake 87 against the spool surface 72, halting the rotation of the spool 62.

The modification consisting of an automatic ice-fishing tip-up, generally designated 200, shown in Figure 6 employs a simplified form of the spring-wound automatic fishing reel 10 of Figure 1 omitting the locking pin 154, the snubber 182 and the resilient reel mount 26. A reel bracket 202 is secured by fasteners 204 directly to the handle 206 of the tip-up rod assembly, generally designated 208. The reel 210 is generally similar to the reel 10 of Figures 1 to 5 but the shaft 94 is elongated so that it is therefore designated 211. The shaft 211 extends through a hole 212 bored transversely through the rod handle 206 with its lower end 214 engageable with the horizontal portion 216 of a forward leg 220 of a tripod, generally designated 222. The latter has rearward legs 224 which have horizontal portions 226 overlapping the horizontal portion 216 of the forward leg 220 and secured thereto as by one or more fasteners 228. Transversely-spaced parallel ears 230 extend upward from the horizontal portion 216 of the forward leg 220 and are bored to receive a horizontal pivot pin 232 which passes through the rod handle 206 and pivotally supports the latter at a location spaced longitudinally away from the hole 212 through which the inner shaft extension 211 passes. The rod handle 206 has its pivot pin 232 located forward of the center of gravity of the tip-up rod assembly 208 and reel 210 mounted thereon. This is arranged, if necessary, by counterweighting the butt 238 of the handle 206 so that it normally hangs in the upwardly and forwardly tilted position shown in Figure 6.

The reel 210 (Figure 7) has lower and upper casing halves 236 and 238 held together by a cap nut 240 threaded onto the threaded upper end of the hollow shaft 242. The latter is similar to the hollow shaft 58 of Figure 1, and is similarly slotted to receive a transverse pin 244 connected to the inner shaft 211 and similarly actuating a brake 246. The brake 246 engages a spool 248 which is connected at 250 to the outer end of a spring 252, the inner end of which is connected at 254 to the hollow shaft 242. A compression spring 256 with one end seated in a hole in the hollow shaft 242 urges the brake 246 into engagement with the spool 248.

In the operation of the automatic ice-fishing tip-up of Figures 6 and 7, the spring of the reel 210 is wound up by unscrewing the cap nut 240, removing the upper casing half 238, and winding up the spool 248 directly by means of the fingers. The brake 246 frictionally holds the spool 248 and spring 252 in their woundup condition. Enough of the line L is paid out according to the depth of the water to place the hook and bait at the desired fishing depth. When the tip-up 200 is idle, the tip-up rod assembly 208 is inclined upward and forward as shown in Figure 6. When a fish strikes the bait and hook, the pull on the line L pulls the tip of the rod assembly 208 downward, thereby causing the inner shaft 211 to be pushed upward by reason of the engagement of its lower end 214 with the horizontal portion 216 of the forward leg 220. This pushes the brake 246 out of engagement with the spool 248, releasing the latter so that the spring 252 imparts a jerk to the spool 248, setting the hook in the mouth of the fish and reeling in the line L.

The reel 10 shown in Figures 1 to 5 inclusive is also capable of being used for bait casting by pulling outward on the pin 154 to unlock the spool 62 and spring casing 130. The result is that the spool 62, brake 87, outer shaft 58, inner shaft 94, and hand crank 82 rotate freely as a unit. The fisherman therefore casts in the usual manner, applying the snubber 82 by means of the hook handle 34 against the reel mount arm 28 to halt the rotation of the spool 62 when the plug or other bait hits the water, so as to prevent backlash. The fisherman can reel in the line manually as in an ordinary reel by using the hand crank 82.

In trout fishing, on the other hand, such as by fly casting, the fisherman unlocks the spool 62 by means of the pin 154, strips off the desired amount of line from the spool 52, and makes the cast in the usual way. When the fly hits the water, the fisherman re-engages the locking pin 154 with the nearest spring housing socket 152, by pushing inward upon the pin 154, thereby rendering the spring 146 again operative to reel in the line when the fisherman pulls the hook handle 34 of the arm 32 toward the stationary arm 28, as described above.

What I claim is:

1. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding means rotatably mounted in said housing, a motor spring having one end secured to said winding means, motion-transmitting mechanism drivingly and rotatingly connecting the opposite end of said spring to said spool, a brake movably mounted in said housing for travel into and out of braking engagement with said spool structure, means for urging said brake into braking engagement with said spool structure, and means responsive to the motion of said movable component in one direction relatively to said fixed component for disengaging said brake from said spool structure.

2. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding means rotatably mounted in said housin, a motor spring having one end secured to said winding means, motion-transmitting mechanism drivingly and rotatably connecting the opposite end of said spring to said spool, a brake movably mounted in said housing for travel into and out of braking engagement with said spool structure, means for urging said brake into braking engagement with said spool structure, a spool snubber movably mounted on said housing for travel into and out of engagement with said spool structure, means for urging said snubber out of snubbing engagement with said spool structure, and means responsive to the motion of said movable component in one direction relatively to said fixed component for disengaging said brake from said spool structure and subsequently snubbingly engaging said snubber with said spool structure.

3. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, a motor spring winding means rotatably mounted in said housing, a motor spring having one end secured to said winding means, motion-transmitting mechanism drivingly and rotatably connecting the opposite end of said spring to said spool, a brake movably mounted in said housing for travel into and out of braking engagement with said spool structure, means for urging said brake into braking engagement with said spool structure, a spool snubber movably mounted on said housing for travel into and out of engagement with said spool structure, means for urging said snubber out of snubbing engagement with said spool structure, and means responsive to the motion of said movable component in one direction relatively to said fixed component for disengaging said brake from said spool structure and subsequently snubbingly engaging said snubber with said spool structure, said brake disengaging means including a brake control member extending from said brake into close proximity to said fixed component, said snubber urging means including a snubber control member extending from said snubber into close proximity to said fixed component, said brake control member extending into closer proximity to said fixed component than said snubber control member for sequential actuation thereof.

4. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding means rotatably mounted in said housing, a motor spring having one end secured to said winding means, motion-transmitting mechanism drivingly and rotatingly connecting the opposite end of said spring to said spool, a brake movably mounted in said housing for travel into and out of braking engagement with said spool structure, means for urging said brake into braking engagement with said spool structure, means responsive to the motion of said movable component in one direction relatively to said fixed component for disengaging said brake from said spool structure, and a hollow shaft mounted in said housing, said spool structure being rotatably mounted on said hollow shaft, said brake disengaging means including a brake control member extending from said brake through said hollow shaft into close proximity to said fixed component.

5. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding means rotatably mounted in said housing, a motor spring having one end secured to said winding means, motion-transmitting mechanism drivingly and rotatably connecting the opposite end of said spring to said spool, a brake movably mounted in said housing for travel into and out of braking engagement with said spool structure, means for urging said brake into braking engagement with said spool structure, a spool snubber movably mounted on said housing for travel into and out of engagement with said spool structure, means for urging said snubber out of snubbing engagement with said spool structure, and means responsive to the motion of said movable component in one direction relatively to said fixed component for disengaging said brake from said spool structure and subsequently snubbingly engaging said snubber with said spool structure, and a hollow shaft mounted in said housing, said spool structure being rotatably mounted on said hollow shaft, said brake-disengaging means including a brake control member extending from said brake through said hollow shaft into close proximity to said fixed component.

6. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding means rotatably mounted in said housing, a motor spring having one end secured to said winding means, motion-transmitting mechanism drivingly and rotatably connecting the opposite end of said spring to said spool, a brake movably mounted in said housing for travel into and out of braking engagement with said spool structure, means for urging said brake into braking engagement with said spool structure, a spool snubber movably mounted on said housing for travel into and out of engagement with said spool structure, means for urging said snubber out of snubbing engagement with said spool structure, means responsive to the motion of said movable component in one direction relatively to said fixed component for disengaging said brake from said spool structure and subsequently snubbingly engaging said snubber with said spool structure, and a hollow shaft mounted in said housing, said spool structure being rotatably mounted on said hollow shaft, said brake disengaging means including a brake control member extending from said brake through said hollow shaft into close proximity to said fixed component, said snubber urging means including a snubber control member extending from said snubber into close proximity to said fixed component, said brake control member extending into closer proximity to said fixed component than said snubber control member for sequential actuation thereof.

7. An automatic fishing reel comprising a reel supporting structure including a fixed component adapted to be attached to the handle of a fishing rod and a movable component connected to and movable relatively to said fixed component, a reel housing mounted on said movable component, a fishing line spool structure rotatably mounted in said housing, motor spring winding member rotatably mounted in said housing, a motor spring having one end secured to said winding means, motion-transmitting mechanism drivingly and rotatingly connecting the opposite end of said spring to said spool, a brake movably mounted in said housing for travel into and out of braking engagement with said spool structure, means for urging said brake into braking engagement with said spool structure, and means responsive to the motion of said movable component in one direction relatively to said fixed component for disengaging said brake from said spool structure, said motion-transmitting mechanism including a rotary spring anchorage connected to said opposite end of the spring and drivingly and rotatingly connected to said spool structure, and a locking element secured to said housing and selectively movable into and out of rotation-preventing engagement with said anchorage.

References Cited in the file of this patent

UNITED STATES PATENTS

| | | |
|---|---|---|
| 371,777 | McCabe | Oct. 18, 1887 |
| 871,345 | Kleinschmidt | Nov. 19, 1907 |
| 1,662,347 | Stocking | Mar. 13, 1928 |
| 2,129,443 | Perrine | Sept. 6, 1938 |
| 2,175,756 | Maury | Oct. 10, 1939 |
| 2,657,492 | Skorr | Nov. 3, 1953 |
| 2,709,867 | Routh | June 7, 1955 |
| 2,711,865 | Ruterbories | June 28, 1955 |
| 2,723,808 | Elliott et al. | Nov. 15, 1955 |